United States Patent Office 3,625,099
Patented Dec. 7, 1971

3,625,099
CORRUGATED THIN GAUGE WEB CUTTING
METHOD AND APPARATUS
Takehisa Mase and Hirosi Kawaura, Kariya-shi, and
Terumoto Yamaguchi and Yosinao Amano, Anjo-shi,
Japan, assignors to Nippondenso Kabushiki Kaisha,
Kariya-shi, Aichi-ken, Japan
Filed Apr. 8, 1970, Ser. No. 26,595
Int. Cl. B26d 5/20
U.S. Cl. 83—13
3 Claims

ABSTRACT OF THE DISCLOSURE

A method of and apparatus for automatic high speed cutting of a corrugated thin gauge web produced and supplied continuously by a corrugated thin gauge web producing machine for producing a predetermined length of web having a fixed number of corrugations of a predetermined pitch adapted for use as a fin material with heat exchangers. The apparatus comprises a feed worm wheel disposed above the path of travel of the corrugated thin gauge web and formed with a number of teeth for giving a uniform pitch to the corrugations of the corrugated thin gauge web, a pair of guide gears disposed posterior to the feed worm wheel and arranged on opposite sides of the path of travel of the corrugated thin gauge web for engaging the opposite sides of a predetermined length of web having a fixed number of corrugations to bring the pitch of the corrugations of the predetermined length of web into means for severing the length of web having the fixed number of corrugations of the predetermied pitch from the rest of the corrugated thin gauge web.

---

This invention relates to a method of and apparatus for automatic high speed cutting of a corrugated thin gauge web produced continuously by a corrugated web producing machine for producing a predetermined length of web having a fixed number of corrugations of a predetermined pitch adapted for use as a fin material with heat exchangers.

In one known method of cutting a corrugated thin gauge web for producing a fin material adapted for use with heat exchangers, the corrugated web continuously produced and supplied by a corrugated web producing machine is cut into a predetermined length of corrugated web by actuating a cutter in response to a mechanical or electrical signal without restraining the corrugated web near the portion thereof in which a cut is made. A corrugated thin gauge web is not essentially rigid enough for maintaining dimensional stability, and it naturally expands and contracts as it moves along its path of travel. Accordingly, the number of corrugations and the portion of the web in which a cut is made have hitherto varied from one length of web to another. With an increase in the rate of movement of the corrugated thin gauge web when it is cut into a predetermined length of corrugated web for use as a fin material, the tendency to non-uniformity of the number and shape of the corrugations has increased, rendering the product unsatisfacory for specifications and orders. Thus, it has hitherto been impossible to increase the rate of cutting of the corrugated web and produce a fin material of high quality at reduced cost.

The present invention obviates this problem. Accordingly, this invention has as its object the provision of an improved method of and apparatus for automatic high speed cutting of a corrugated thin gauge web produced and supplied automatically by a corrugated web producing machine for producing, at high speed and low cost, a predetermined length of web having a fixed number of corrugations of a predetermined pitch adapted for use as a fin material with heat exchangers.

According to the invention, there is provided a method of cutting a corrugated thin gauge web and an apparatus for carrying said method into practice, such method comprising the steps of giving a uniform pitch by a feed worm wheel having a number of teeth to the corrugations of the corrugated thin gauge web supplied continuously from the corrugated web producing machine, bringing said pitch of the corrugations of the thin gauge web into agreement with a predetermined pitch of the corrugations of a predetermined length of web by a pair of guide gears having teeth of a predetermined pitch to keep said predetermined corrugation pitch and adapted to engage the opposite side surfaces of the corrugated thin gauge web, permitting the worm wheel and the pair of guide gears to dwell for a predetermined interval of time after they have rotated a distance corresponding to the predetermined length of corrugated thin gauge web, and severing the length of web having corrugations of the predetermined pitch from the rest of the corrugated thin gauge web by cutting means.

Additional objects as well as features and advantages of the invention will become evident from consideration of the description set forth hereinafter when considered in conjunction with the accompanying drawings, in which.

Figure 1:
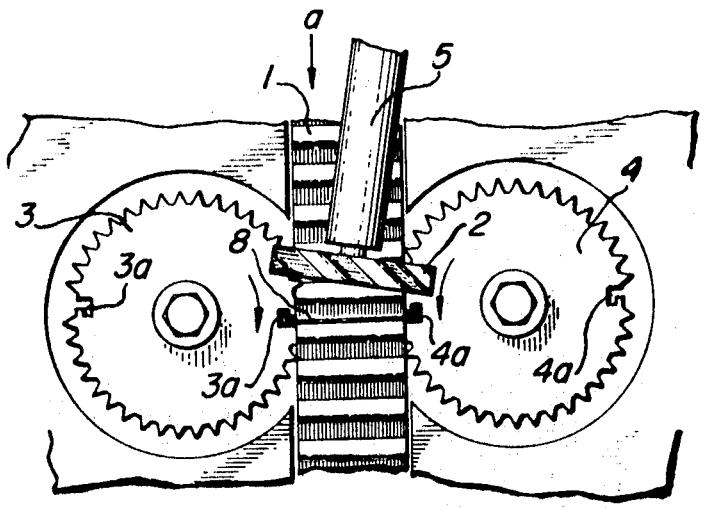
FIG. 1 is a top plan view of the apparatus for automatic high speed cutting of a corrugated thin gauge web into a length of web having a fixed number of corrugations of a predetermined pitch according to this invention.
Figure 2:
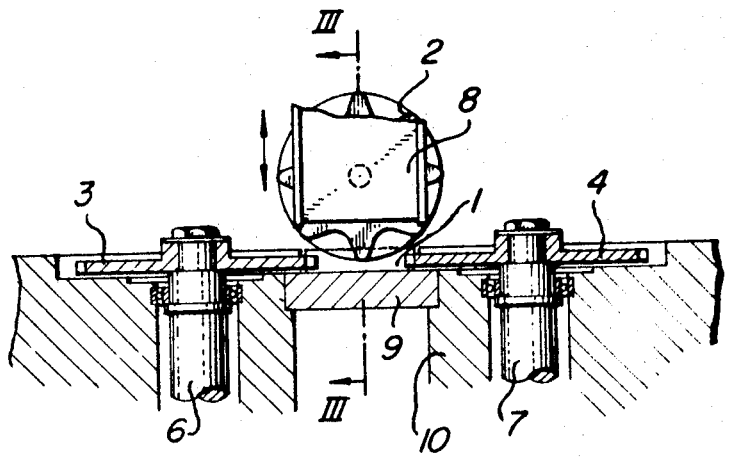
FIG. 2 is a longitudinal sectional front view of the apparatus of FIG. 1.
Figure 3:
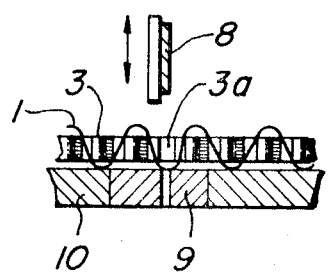
FIG. 3 is a sectional view taken along the line III—III of FIG. 2.

A preferred embodiment of the invention will be described with reference to the accompanying drawings. In FIGS. 1, 2 and 3, a corrugated thin gauge web 1 continuously produced and supplied by a corrugated web producing machine is moved in the direction of arrow *a* along its path of travel. A worm wheel 2 formed on its outer circumferential surface with a number of teeth for giving a uniform pitch to the corrugations of the web 1 while feeding the same is mounted vertically above the path of travel of the corrugated web and disposed perpendicularly thereto. The worm wheel 2 is angularly displaced therefrom so that its teeth may come into meshing engagement with the corrugations of the web 1. A pair of guide gears 3 and 4 formed with teeth of a pitch which is one half of a predetermined pitch of the corrugations of a length of web to be servered are disposed on opposite sides of the path of travel of the corrugated thin gauge web 1. The gears 3 and 4 are disposed horizontally in the same plane as the corrugated web 1 with their axes of rotation being perpendicular to the path of travel of the corrugated web. The number of teeth of the gears 3 and 4 may be an integral multiple (quadruple in the embodiment shown) of the number of corrugations of the length of corrugated web to be severed and used as a fin material. The worm wheel 2 is rotatably supported by a rotary shaft 5 and the guide gears 3 and 4 are rotatably supported by rotary shafts 6 and 7 respectively. The rotary shafts 5, 6 and 7 are driven by a known pawl and ratchet mechanism such that the worm wheel and guide gears dwell for a predetermined interval of time after the predetermined length of the corrugated web for use as a fin material is severed from the rest of the corrugated web.

More specifically, in the embodiment shown and described, the rotary shafts 6 and 7 dwell for the same interval of time as the rotary shaft 5 after they have rotated through a rotational angle of 180°. A movable upper cutter 8 for cutting the web 1 is mounted between the guide gears 3 and 4 and disposed perpendicularly thereto. A fixed lower cutter 9 for cooperating with the upper cutter 8 for severing the predetermined length of corrugated web from the rest of the web is mounted between the guide gears 3 and 4 and embedded in a supporting table 10. The movable upper cutter 8 is adapted to be moved downwardly and upwardly at high speed by means of a toggle mechanism while the worm wheel 2 and guide gears 3 and 4 remain stationary.

Figure 4:
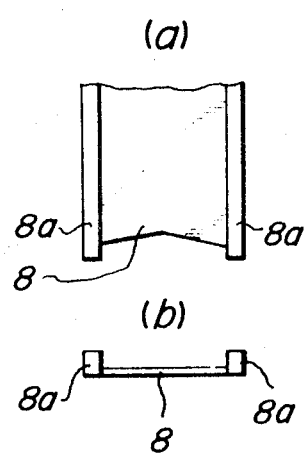
FIGS. 4a and 4b are a front view and a bottom plan view respectively of the upper cutter of the apparatus of FIG. 1.
Figure 5:
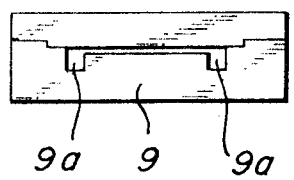
FIG. 5 is a top plan view of the lower cutter of the apparatus of FIG. 1.

In FIGS. 4a, 4b and 5, the upper cutter 8 is formed on the lower opposite sides with reinforcing and guide portions 8a, 8a which are adapted to be intimately received in openings 9a, 9a formed on the upper opposite sides of the lower cutter 9. Cutouts 3a, 3a are formed in the marginal portion of the guide gear 3 in positions diametrically opposed to each other and cutouts 4a, 4a are formed in the marginal portion of the guide gear 4 in positions diametrically opposed to each other (FIG. 1), so that the portions 8a, 8a of the upper cutter 8 extend through the cutouts 3a and 4a respectively when the upper cutter 8 moves downwardly as the gears 3 and 4 stop rotating.

The method of cutting the corrugated thin gauge web 1 by the apparatus constructed as aforementioned will now be described. The corrugated thin gauge web 1 produced and supplied continuously by a corrugated web producing machine is moved in the direction of arrow a along the path of its travel and delivered to the feed worm wheel 2 while expanding and contracting on the way. The teeth of the worm wheel 2 engage and give a uniform pitch to the corrugations of the web 1 so as to facilitate the engagement of the teeth of the guide gear 3 and 4, with the corrugations of the web 1. As the corrugations of the web 1 are released from engagement with the spiral teeth of the rotating worm wheel, they are engaged at opposite side surfaces by the teeth of the guide gears 3 and 4, so that the pitch of the corrugations of the web 1 is brought into agreement with a predetermined pitch of corrugations of a predetermined length of web adapted for use as a fin material. The worm wheel 2 stops rotating when the guide gears 3 and 4 stop rotating after making one-half revolution to dwell for predetermined period of time. As the worm wheel and the guide gears dwell, the cutouts 3a and 4a are indexed with each other across the width of the web 1. This arrangement permits to move forwardly the predetermined length of web having a fixed number of corrugations of the predetermined pitch and cause the center of a depressed area to be disposed in a cutting position. As soon as the guide gears 3 and 4 stop rotating, the upper cutter 8 moves downwardly to cut the predetermined length of web in cooperation with the lower cutter 9, with the reinforcing and guiding portions 8a, 8a of the cutter 8 extending through the aligned cutouts 3a and 4a to be received in the openings 9a, 9a.

From the foregoing description, it will be appreciated that in the method provided by the present invention, a uniform pitch is given by a feed worm wheel to a corrugated thin gauge web produced and supplied continuously by a corrugated web producing machine, the pitch of the corrugations of the web is brought by a pair of guide gears into agreement with a predetermined pitch of the corrugations of a predetermined length of web to be cut and used as a fin material, and the length of the web having corrugations of the predetermined pitch is severed from the rest of the web by cutting means mounted between the guide gears and disposed normal to the axes of rotation of the guide gears while the worm wheel and guide gears are cused to dwell for a predetermined period of time after they have rotated a distance corresponding to the predetermined length of corrugated thin gauge web. Hereinbefore, the present invention has been explained with reference to the embodiment which is provided with a pair of gears having teeth whose pitch is one half of a predetermined pitch of the corrugations of a length of web to be severed. However, it should be understood that a pair of guide gears having teeth of the same pitch as said predetermined pitch of the corrugations can also be used for the same purpose. The invention permits to produce a predetermined length of web having a fixed number of corrugations of a predetermined pitch cut accurately in a predetermined position. Accordingly, it is possible to produce a fin material adapted for use with heat exchangers which is satisfactory for specifications and orders. Since the invention permits to cut a predetermined length of corrugated web of high quality even when the rate of cutting is increased, the invention is conducive to reduction of the cost of production of a fin material of high quality.

What we claim is:

1. A method of cutting a corrugated thin gauge web produced and supplied continuously by a corrugated web producing machine for producing a predetermined length of corrugated thin gauge web having a fixed number of corrugations of a predetermined pitch, such method comprising the steps of giving a uniform pitch to the corrugation of said corrugated thin gauge web by a feed worm wheel having a number of teeth, bringing said pitch of said corrugations of said corrugated thin gauge web into agreement with said predetermined pitch of the corrugations of said predetermined length of corrugated thin gauge web by a pair of guide gears formed with the teeth of a predetermined pitch to keep said perdetermined pitch of the corrugations of said predetermined length of corrugated thin gauge web and adapted to come into engagement with the opposite side surfaces of said predetermined length of corrugated thin gauge web, permitting said worm wheel and said pair of guide gears to dwell for a predetermined interval of time after they have rotated a distance corresponding to said predetermined length of corrugated thin gauge web, and severing said predetermined length of corrugated thin gauge web having said fixed number of corrugations of said predetermined pitch from the rest of the corrugated thin gauge web by cutting means.

2. An apparatus for cutting a corrugated thin gauge web produced and supplied continuously by a corrugated web producing machine for producing a predetermined length of corrugated thin gauge web having a fixed number of corrugations of a predetermined pitch, such apparatus comprising a feed worm wheel mounted vertically above the path of travel of said corrugated thin gauge web supplied continuously by said corrugated web producing machine and disposed perpendicularly thereto, said feed worm wheel being angularly displaced from the path of travel of said corrugated thin gauge web and formed on its outer circumferential surface with a number of teeth disposed at right angles to the path of movement of the corrugated thin gauge web for engaging and giving a uniform pitch to the corrugations of said corrugated thin gauge web, a pair of guide gears mounted posterior to said feed worm wheel and horizontally on opposite sides of the path of travel of said corrugated thin gauge web and disposed in the same plane as said corrugated thin gauge web with their axis of rotation being perpendicular thereto, said pair of guide gears being formed on their outer circumferential surfaces with teeth of a predetermined pitch to keep said predetermined pitch of the corrugations of said predetermined length of corrugated thin gauge web and adapted to engage the opposite side surfaces of said predetermined length of corrugated thin gauge web, means for causing said feed worm wheel and said guide gears to dwell for a predetermined interval of time after they have rotated a distance corresponding to said predetermined length of corrugated thin gauge web, cutter means for severing said predetermined length of corrugated thin gauge web having said fixed number of corrugations of said predetermined pitch from the rest of the corrugated thin gauge web, and means for actuating said cutter means while said feed worm wheel and said pair of guide gears dwell.

3. An apparatus for cutting a corrugated thin gauge web as claimed in claim 2 wherein the number of teeth of said pair of guide gears is an integral multiple of the number of corrugations of said predetermined length of corrugated thin gauge web, and said cutting means includes an upper movable cutter disposed perpendicularly to the path of travel of said corrugated thin gauge web for vertical up and down movement and a lower fixed cutter mounted in a supporting bed for cooperation with said movable upper cutter, each of said pair of guide gears being formed in its marginal portion with cutouts disposed in positions between every two sets of teeth each set having teeth equal in number to the corrugations of said predetermined length of corrugated thin gauge web, so that opposite sides of said upper cutter extend through the indexed cutouts of the two guide gears when moved downwardly to sever said predetermined length of corrugated thin gauge web having said fixed number of corrugations of said predetermined pitch from the rest of the corrugated thin gauge web.

References Cited

UNITED STATES PATENTS

| | | | |
|---|---|---|---|
| 1,085,077 | 1/1914 | Ballard | 83—423 X |
| 1,726,464 | 8/1929 | Abbott | 226—76 X |

FOREIGN PATENTS

| | | | |
|---|---|---|---|
| 1,157,470 | 11/1963 | Germany | 83—278 |

WILLIAM S. LAWSON, Primary Examiner

U.S. Cl. X.R.

83—42, 276, 278, 279, 423, 925; 226—76, 108